(12) United States Patent
Miwa et al.

(10) Patent No.: US 7,247,225 B2
(45) Date of Patent: *Jul. 24, 2007

(54) ELECTRODEIONIZATION APPARATUS

(75) Inventors: Masayuki Miwa, Tokyo (JP); Shin Sato, Tokyo (JP); Takayuki Moribe, Tokyo (JP)

(73) Assignee: Kurita Water Industries Ltd., Tokyo (JP)

(*) Notice: Subject to any disclaimer, the term of this patent is extended or adjusted under 35 U.S.C. 154(b) by 226 days.

This patent is subject to a terminal disclaimer.

(21) Appl. No.: 11/015,797

(22) Filed: Dec. 20, 2004

(65) Prior Publication Data

US 2005/0098436 A1 May 12, 2005

Related U.S. Application Data

(63) Continuation of application No. PCT/JP03/07972, filed on Jun. 24, 2003.

(30) Foreign Application Priority Data

| Jul. 1, 2002 | (JP) | ............................. 2002-192312 |
| Nov. 15, 2002 | (JP) | ............................. 2002-332671 |

(51) Int. Cl.
*B01D 61/48* (2006.01)
(52) U.S. Cl. .................................................. 204/632
(58) Field of Classification Search ................. 204/632
See application file for complete search history.

(56) References Cited

U.S. PATENT DOCUMENTS

| 5,593,563 A | 1/1997 | Denoncourt |
| 6,649,037 B2 * | 11/2003 | Liang et al. ................. 204/632 |
| 6,733,646 B2 * | 5/2004 | Sato et al. ................. 204/524 |

FOREIGN PATENT DOCUMENTS

| EP | 1 068 901 | 7/2000 |
| EP | 1 075 868 | 8/2000 |
| JP | 10-43554 | 2/1998 |
| JP | 2000-504273 | 4/2000 |
| JP | 2001-25647 | 1/2001 |
| JP | 2001-113279 | 4/2001 |
| JP | 2001-113280 | 4/2001 |
| JP | 2001-113281 | 4/2001 |
| JP | 2002-11475 | 1/2002 |
| JP | 2002-136971 | 5/2002 |
| JP | 2002-210473 | 7/2002 |
| JP | 2003-500783 | 1/2003 |
| JP | 2003-126862 | 5/2003 |
| WO | WO 98/11987 | 3/1998 |
| WO | WO 98/20972 | 5/1998 |

* cited by examiner

*Primary Examiner*—Arun S. Phasge
(74) *Attorney, Agent, or Firm*—Manabu Kanesaka

(57) ABSTRACT

An electrodeionization apparatus is provided, in which enough electric current flows even when voltage applied between the electrodes is low, thereby sufficiently performing deionization. A single first cation exchange membrane, a single anion exchange membrane, a single second cation exchange membrane are arranged between a cathode and an anode so that a concentration-cathode compartment, a desalting compartment, a concentrating compartment, and an anode compartment are formed, in this order, between the cathode and the anode. The concentration-cathode compartment and the anode compartment are filled with a cation exchange resin, respectively. The desalting compartment is filled with a mixture of the cation exchange resin and an anion exchange resin. Fed into the anode compartment is raw water or deionized water. Water from the anode compartment is sent to the concentrating compartment and the concentration-cathode compartment sequentially.

17 Claims, 6 Drawing Sheets

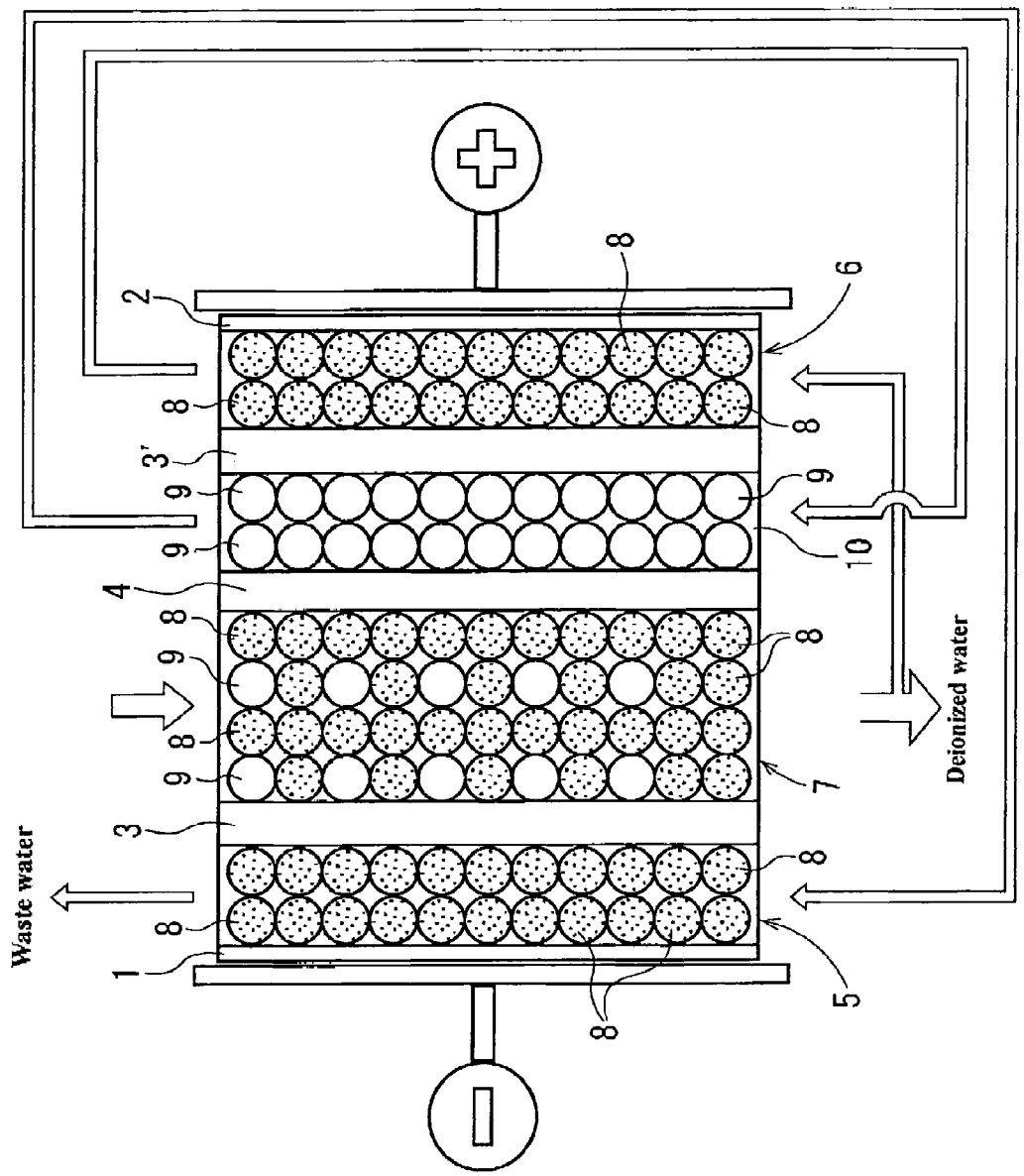

ELECTRODEIONIZATION APPARATUS

CROSS REFERENCE TO RELATED APPLICATION

This is a continuation application of PCT/JP03/07972 filed on Jun. 24, 2003.

FIELD OF THE INVENTION

The present invention relates to an electrodeionization apparatus and, more particularly, to an electrodeionization apparatus which is suitably for a case of small amount of deionized water as product water per unit time.

BACKGROUND OF THE INVENTION

Conventional electrodeionization apparatus has a structure in which a plurality of cation exchange membranes and a plurality of anion exchange membranes are alternately arranged between electrodes (anode and cathode) in such a manner as to alternately form desalting compartments and concentrating compartments and the desalting compartments are filled with ion exchange resin. In the electrodeionization apparatus, water to be treated is introduced into the desalting compartments and concentrated water is introduced into the concentrating compartments while voltage is applied between the cathode and the anode so that impurity ions are removed from the water to be treated, thereby producing deionized water.

Since the desalting compartments and the concentrating compartments are alternately formed between the cathode and the anode in the conventional electrodeionization apparatus, electric resistance between the cathode and the anode is large and the voltage applied between the cathode and the anode is high. In addition, calcium carbonate scale is sometimes generated on ion exchange membranes in the concentrating compartments due to $Ca^{2+}$ and components ($CO_2$, $HCO_3^-$) in raw water.

The first object of the present invention is to provide an electrodeionization apparatus which is suitably employed in case of small amount of deionized water as product water and in which the voltage applied between electrodes is low and scale is hardly generated.

SUMMARY OF THE INVENTION

As an achievement of the first object, the applicant has proposed, in JP2003-136063A, an electrodeionization apparatus in which a cation exchange membrane and an anion exchange membrane are disposed between a cathode and an anode so that a concentration-cathode compartment functioning both as a concentrating compartment and a cathode compartment is formed between the cathode and the cation exchange membrane, a concentration-anode compartment functioning both as a concentrating compartment and an anode compartment is formed between the anode and the anion exchange membrane, and a desalting compartment is formed between the cation exchange membrane and the anion exchange membrane, wherein the concentration-cathode compartment and the concentration-anode compartment are filled with conductive material and the desalting compartment is filled with ion exchanger; and an electrodeionization apparatus in which a cation exchange membrane and an anion exchange membrane are disposed between a cathode plate and an anode plate so that a concentration-cathode compartment is formed between the cathode plate and the cation exchange membrane, a concentration-anode compartment is formed between the anode plate and the anion exchange membrane, and a desalting compartment is formed between the cation exchange membrane and the anion exchange membrane, wherein the cathode plate and the anode plate has passages for electrode water and wherein the cathode plate abuts on the cation exchange membrane and the anode plate abuts on the anion exchange membrane.

In the electrodeionization apparatus of JP2003-136063A, since the number of desalting compartment is one and the concentrating compartment also functioning as the anode compartment and the concentrating compartment also functioning as the cathode compartment are arranged on both sides of the desalting compartment, the distance between the electrodes is short so that the voltage applied between the electrodes is low.

As the applicant has further studied about the electrodeionization apparatus of JP2003-136063A, it was found that, if $Cl^-$ ions exist in raw water, $Cl^-$ is subjected to oxidation reaction in the concentration-anode compartment so as to produce $Cl_2$ which may gradually deteriorate conductive material such as cation exchange resin filled in the concentration-anode compartment and/or the ion exchange membrane facing the concentration-anode compartment.

The second object of the present invention is to prevent the deterioration of conductive material such as cation exchange resin and an ion exchange membrane.

In an electrodeionization apparatus of the first aspect, a first cation exchange membrane, an anion exchange membrane, and a second cation exchange membrane are arranged between the cathode and the anode in this order, a concentration-cathode compartment is formed between the cathode and the first cation exchange membrane, a desalting compartment is formed between the first cation exchange membrane and the anion exchange membrane, a concentrating compartment is formed between the anion exchange membrane and the second cation exchange membrane, an anode compartment is formed between the second cation exchange membrane and the anode, the concentrating compartment, the anode compartment, and the concentration-cathode compartment are filled with conductive materials, respectively, and the desalting compartment is filled with an ion exchanger.

In an electrodeionization apparatus of the second aspect, instead of filling the anode compartment and the concentration-cathode compartment with conductive materials in the aforementioned electrodeionization apparatus of the first aspect, an anode plate and a cathode plate are provided with passages allowing electrode water to flow therethrough so that the anode plate and the cathode plate abut on the ion exchange membranes.

That is, in the electrodeionization apparatus of the second aspect, a first cation exchange membrane, an anion exchange membrane, and a second cation exchange membrane are arranged between the cathode plate and the anode plate in this order, a concentration-cathode compartment is formed between the cathode plate and the first cation exchange membrane, a desalting compartment is formed between the first cation exchange membrane and the anion exchange membrane, a concentrating compartment is formed between the anion exchange membrane and the second cation exchange membrane, and an anode compartment is formed between the second cation exchange membrane and the anode plate. The electrodeionization apparatus is characterized in that the cathode plate and the anode plate have passages for electrode water, the cathode plate abuts on the first cation exchange membrane, and the anode plate abuts on the second cation exchange membrane.

In either of the electrodeionization apparatuses of the first aspect and the second aspect, the number of the desalting compartment is one, the concentrating compartment and the concentration-cathode compartment are arranged on both sides of the desalting compartment, and the anode compartment is arranged adjacent to the concentrating compartment so that the distance between the electrodes is short, thereby lowering the voltage applied between the electrodes.

In the present invention, the anode compartment is provided separately from the concentrating compartment and these compartments are separated by the second cation exchange membrane, thereby preventing the migration of $Cl^-$ ions from the concentrating compartment and the anode compartment. Therefore, the $Cl_2$ generated in the anode compartment derives only from $Cl^-$ existing the electrode water fed in the anode compartment so that the amount of $Cl_2$ generated in the anode compartment is significantly small. Accordingly, the conductive material such as a cation exchange resin filled in the anode compartment and the second cation exchange membrane exposed to the anode compartment are prevented from deterioration due to $Cl_2$.

In the present invention, since there is only one desalting compartment, the amount of product water per unit time is small. However, the electrodeionization apparatus is enough for practical use, for example, in a small laboratory and for a small fuel cell.

In the electrodeionization apparatus of the present invention, the desalting compartment may be divided into a large number of cells by a partition member and the cells may be filled with an ion exchanger. At least parts of the partition member facing each cell are inclined relative to a general flow direction of water in the desalting compartment and at least the inclined parts of the partition member allow penetration of water but prevent the penetration of the ion exchanger. At least a part of water in the desalting compartment flows obliquely relative to the general flow direction of water and thus flows to scatter entirely in the desalting compartment. Therefore, the contact efficiency between the water and the ion exchange resin is improved, thus improving the deionization property.

A plurality of cells are arranged along the membrane surface in both the general flow direction of water and a direction perpendicular to the general flow direction of the desalting compartment (for example, cells are arranged in a matrix form), thereby extremely increasing the contact efficiency between the water and the ion exchange resin. In addition, the cells have small height in the vertical direction, thereby preventing the ion exchange resin from being partially compressed. Therefore, no clearance is created in the cells and thus the filling density of the ion exchange resin is high.

The shape of the cell as projected on the ion exchange membrane may be hexagonal shape and square shape. In a case of hexagonal shape, the cells are preferably arranged such that a pair of parallel sides of each cell extend in the general flow direction of water. In case of square shape, the cells are arranged such that the respective sides of each cell are inclined relative to the general flow direction of water. According to the structure, the desalting efficiency is improved so as to enable water to flow into the desalting compartment at a high speed, thereby increasing the treating amount of water per one desalting compartment.

A single cell may be filled with an ion exchanger having a single ion exchange characteristic or with an ion exchanger having a plurality of ion exchange characteristics. For example, a single cell may be filled with a mixture of an anion exchanger and an amphoteric ion exchanger.

In the electrodeionization apparatus of the present invention, raw water or deionized water from the desalting compartment may be fed as electrode water to the anode compartment, water discharged from the anode compartment may be fed to the concentrating compartment, and water discharged from the concentrating compartment may be fed to the concentration-cathode compartment.

BRIEF DESCRIPTION OF DRAWINGS

FIG. 7 is a schematic vertical sectional view of an electrodeionization apparatus according to another embodiment.

DETAILED DESCRIPTION

Hereinafter, embodiments of an electrodeionization apparatus of the present invention will be described with reference to the attached drawings.

Figure 1:
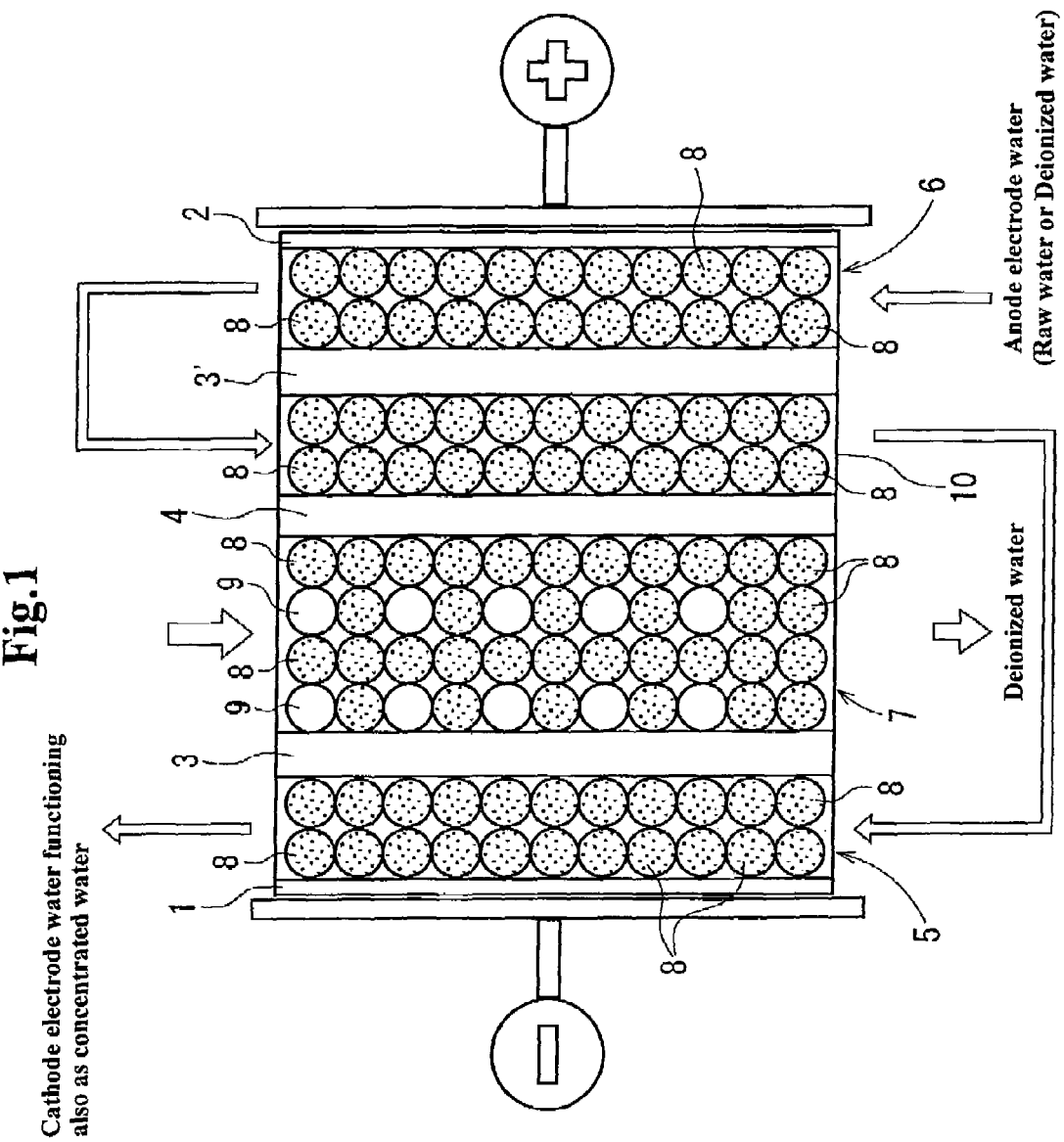
FIG. 1 is a vertical sectional view schematically showing an electrodeionization apparatus according to an embodiment.
Figure 2:
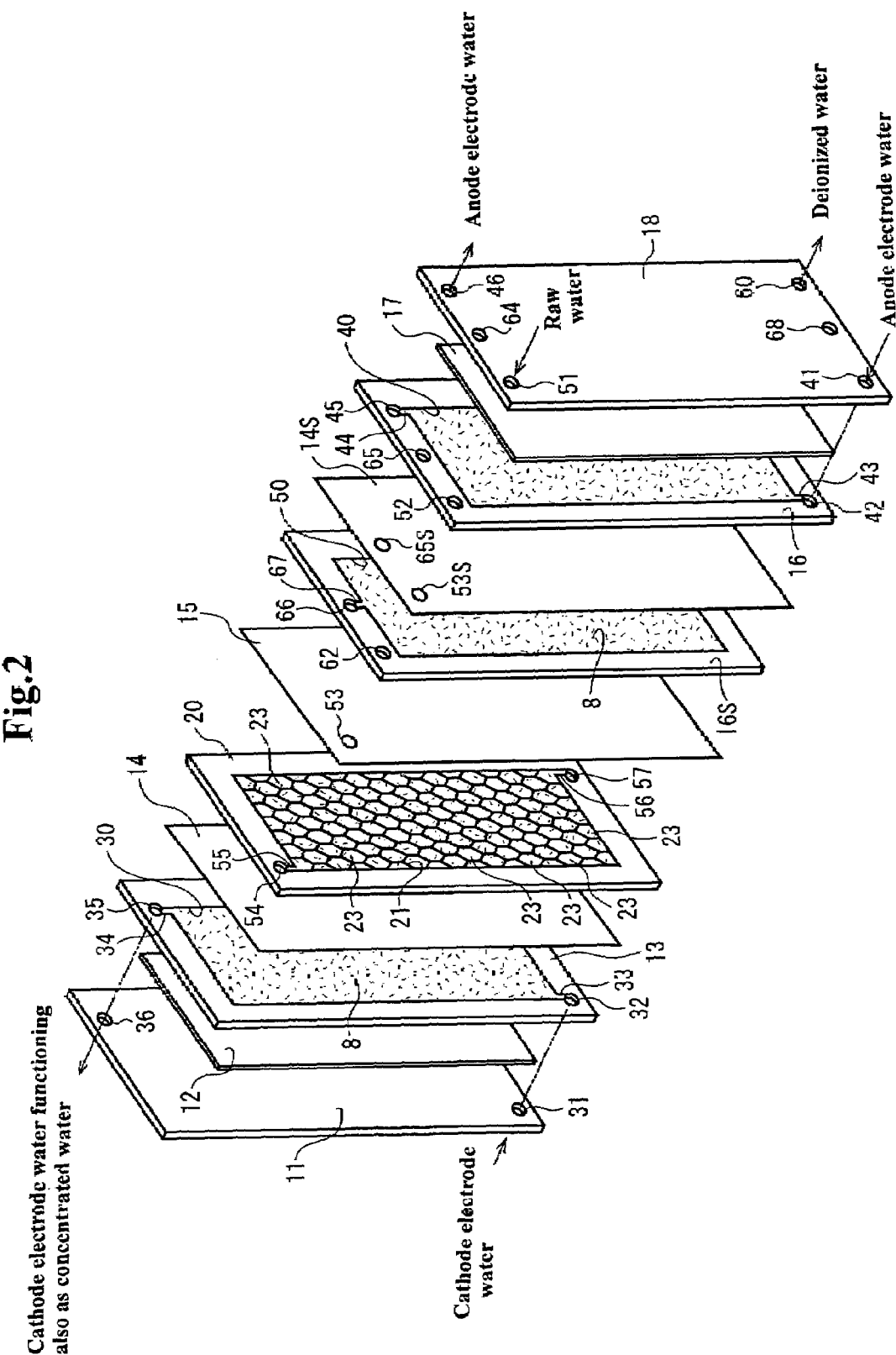
FIG. 2 is an exploded perspective view of an electrodeionization apparatus according to another embodiment in which a partition member is arranged in a desalting compartment.
Figure 3:
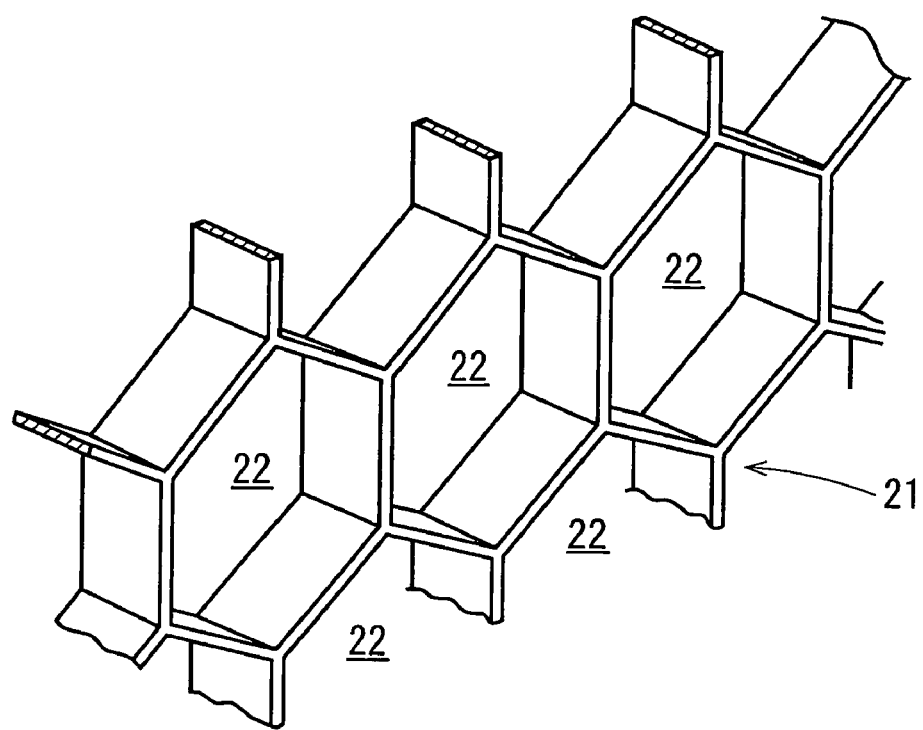
FIG. 3 is a perspective view of the partition member.

[Electrodeionization Apparatus Shown in FIG. 1]

In an electrodeionization apparatus shown in FIG. 1, a first cation exchange membrane 3, an anion exchange membrane 4, and a second cation exchange membrane 3' are disposed between a cathode 1 and an anode 2. A concentration-cathode compartment 5 functioning both as a concentrating compartment and a cathode compartment is formed between the cathode 1 and the first cation exchange membrane 3 and a desalting compartment 7 is formed between the first cation exchange membrane 3 and the anion exchange membrane 4. A concentrating compartment 10 is formed between the anion exchange membrane 4 and the second cation exchange membrane 3' and an anode compartment 6 is formed between the second cation exchange membrane 3' and the anode 2.

The concentration-cathode compartment 5, the concentrating compartment 10, and the anode compartment 6 are filled with a cation exchange resin 8. It should be noted that an anion exchange resin or a mixture of an anion exchange resin and a cation exchange resin may be used to fill the concentration-cathode compartment 5, the concentrating compartment 10, and the anode compartment 6. However, a cation exchange resin is preferable in view of the strength of resin, especially for filling the concentration-cathode compartment 5 and the anode compartment 6. The desalting compartment 7 is filled with a mixture of the cation exchange resin 8 and the anion exchange resin 9.

The desalting compartment 7 is provided at its one end with an inlet for raw water and is provided at its other end with an outlet for deionized water.

The anode compartment 6 is provided at its one end with an inlet for raw water or deionized water. Water from the anode compartment 6 is sent to the concentrating compartment 10 through one end thereof and is discharged from the concentrating compartment 10 through the other end thereof. Water from the concentrating compartment 10 is sent to the concentration-cathode compartment 5 through one end thereof and is discharged, as cathode electrode water functioning also as concentrated water, from the concentration-cathode compartment 5 through the other end thereof.

In FIG. 1, raw water is fed into the desalting compartment 7 while a voltage is applied between the cathode 1 and the anode 2 and is taken out as deionized water. As mentioned above, raw water or the deionized water is fed into the anode compartment 6 and is sent to the concentrating compartment 10 and the concentration-cathode compartment 5 sequentially. Cations in the raw water permeate the first cation exchange membrane 3 and are discharged in a state mixed with the cathode water. Anions in the raw water permeate the anion exchange membrane 4, migrate into the concentrating compartment 10, and are discharged through the concentration-cathode compartment 5 in a state mixed with the water from the concentrating compartment.

[Electrodeionization Apparatus Shown in FIG. 7]

An electrodeionization apparatus of FIG. 7 differs from the electrodeionization apparatus of FIG. 1 in that the concentrating compartment 10 is filled with an anion exchange resin 9 and that deionized water is partially fed into the anode compartment 6 and the water flow is also carried out in the concentrating compartment 10 in which the direction of the water flow is upward. The other structure of the electrodeionization apparatus of FIG. 7 is the same as that of the electrodeionization apparatus of FIG. 1. In FIG. 7, members exhibiting the same functions as those of the corresponding members shown in FIG. 1 are marked with the same reference numerals.

The electrodeionization apparatus of FIG. 7 in which the concentrating compartment 10 is filled with an anion exchange resin 9 has the following effects.

In the electrodeionization apparatus of FIG. 7, cations in raw water permeate the first cation exchange membrane 3 and are discharged in a state mixed with the cathode water. Anions in the raw water permeate the anion exchange membrane 4, migrate into the concentrating compartment 10, and are discharged through the concentration-cathode compartment 5 in a state mixed with the water from the concentrating compartment. Weak ion components such as $CO_2$ and silica which are hardly discharged are changed to forms of $HCO_3^-$ and $HSiO_3^-$ because of $OH^-$ generated by water desorption in the desalting compartment 7 and are thus discharged to the concentrating compartment 10.

At the interface of the anion exchange membrane 4 near the concentrating compartment 10, anion components are most concentrated because of concentration polarization. However, when the concentration polarizations of $HCO_3^-$ and $HSiO_3^-$ which hardly move become too large, there must be a problem of reduction in removing rate because electric resistance increases and the migration of ions becomes difficult.

As cation exchange resin of opposite electrification exists at the interface of the anion exchange membrane 4 near the concentrating compartment 10, the movement of anions becomes slower so as to further facilitate the generation of the aforementioned concentration polarizations. On the other hand, as anion exchange resin exists, the movement of anions becomes faster so as to make the generation of the concentration polarizations difficult.

As the filling ratio of the anion exchanger/cation exchanger of the ion exchanger for the concentrating compartment 10 is set to be greater than the filling ratio of the anion exchanger/cation exchanger of the ion exchanger for the desalting compartment 7, the movement of the anions becomes faster. This is preferable. It is specially preferable in view of the moving speed of anions that the concentrating compartment 10 is filled with the anion exchanger.

The concentration polarization of the concentrating surface of the anion exchange membrane 4 in the concentrating compartment 10, especially the concentration polarization of weak ion components such as $CO_2$ and silica, more easily occurs, as the amount of weak ion components such as $CO_2$ and silica flowing into the desalting compartment 7 is larger, the amount of components of $CO_2$ and silica migrating to the concentrating compartment 10 from the desalting compartment 7 through the anion exchange membrane 4 is larger, or the current density is higher.

However, by setting the filling ratio of the anion exchanger/cation exchanger of the ion exchanger for the concentrating compartment 10 to be greater than the filling ratio of the anion exchanger/cation exchanger of the ion exchanger for the desalting compartment 7 and preferably filling the concentrating compartment 10 with only anion exchanger, more preferably with only anion exchange resin, the electrodeionization apparatus can exhibit excellent desalting performance and excellent stability of operation even with high loading dose of such weak ion components. For example, even when the loading dose ($mg-CO_2/h$) of carbonic acid fed into the desalting compartment 7 is 80 or more, especially from 250 to 300, relative to an effective surface area ($dm^2$) of the anion exchange membrane 4 of the desalting compartment 7, the loading dose ($mg-SiO_2/h$) of silica fed into the desalting compartment is 8 or more, particularly from 15 to 25, relative to an effective surface area ($dm^2$) of the anion exchange membrane 4 of the desalting compartment 7, and the current density is 300 $mA/dm^2$ or more, particularly from 600 to 1200 $mA/dm^2$, the electrodeionization apparatus can exhibit stability in view of desalting performance and electric resistance. Therefore, the electrodeionization apparatus can be miniaturized so that it is significantly effective also from economical viewpoint.

Feed water to be fed into the electrodeionization apparatus is generally water prepared by treating raw water such as city water with activated carbon treatment and reverse osmosis membrane separation (RO) treatment. The feed water has electric conductivity of from 3 to 10 $\mu S/cm$, $CO_2$ concentration of from 3 to 30 ppm, and silica concentration of from about 0.2 to 1.0 ppm. For this feed water, the filling ratio of the anion exchanger/cation exchanger of the ion exchanger for the desalting compartment 7 is preferably from 60/40 to 70/30 (as a volume ratio in case of anion exchange resin of regenerative form and cation exchange resin of regenerative form).

In either of the electrodeionization apparatuses of FIGS. 1 and 7, the ion exchangers filled in the concentrating compartment 10, the desalting compartment 7, the concentration-cathode compartment 5, and the anode compartment 6 are preferably composed of ion exchange resin from viewpoint of convenience in handling. In this case, as for the degree of cross-linkage of the ion exchange resin, the degree of cross-linkage of the anion exchange resin is preferably in a range of from 3% to 8% and the degree of cross-linkage of the cation exchange resin is preferably in a range of from 5 to 10%. This is because too small degree of cross-linkage of the ion exchange resin makes the strength weak and too large degree of cross linkage of the ion exchange resin makes the electric resistance large.

In the electrodeionization apparatus of FIG. 7, the concentrating compartment 10 may be filled with an ion exchanger other than the ion exchange resin, for example an ion exchange fiber. It is preferable that the filling ratio of the anion exchanger/cation exchanger in the concentrating compartment 10 is larger than the filling ratio of the anion exchanger/cation exchanger in the desalting compartment 7 and that the concentrating compartment 10 is filled with only an anion exchanger. As the ratio of the anion exchange resin increases, the deterioration proceeds so that electric resistance increases in case of prolonged operation. That is, generally, the deterioration of the anion exchange resin may occur prior to the oxidation deterioration of the cation exchanger in the presence of oxygen. When the ratio of the anion exchange resin in concentrating compartment 10 is increased, especially when the anion exchange resin is used solely, it is preferable to use an anion exchange resin which has resistance to the oxidation deterioration and is heat-stable.

In each of the electrodeionization apparatuses of FIGS. 1 and 7, the concentration-cation compartment 5 is preferably filled with only a cation exchanger because the larger the amount of the cation exchanger is, the faster the movement of cations is. On the other hand, the anode compartment 6 is preferably filled with only a cation exchanger which has resistance to the oxidation because oxidizer is generated by electrode reaction at the plate surface of the anode 2. Since the anode 2 may deteriorate due to the oxidizer and the cathode 1 may have pitting corrosion, it is preferable to use, as the anode 2 and the cathode 1, electrodes which are excellent in corrosion resistance and are made of material such as platinum-plated titanium.

In each of the electrodeionization apparatuses of FIGS. 1 and 7, since the single concentration-cathode compartment 5, the single desalting compartment 7, the single concentrating compartment 10, and the single anode compartment 6 are arranged between the cathode 1 and the anode 2, the distance between the cathode 1 and the anode 2 is small. Therefore, even when the voltage applied between the electrodes 1 and 2 is low, enough electric current flows therebetween during the deionization process.

$Cl^-$ in the desalting compartment migrates only to the concentrating compartment 10 and does not migrate to the anode compartment 6. Therefore, the $Cl^-$ in the anode compartment 6 is composed of only $Cl^-$ existing in the raw water or the deionized water so that the amount of $Cl_2$ produced by anode oxidation at the anode compartment 6 is significantly small. Accordingly, the cation exchange resin 8 in the anode compartment 6 and the second cation exchange membrane 3' exposed to the anode compartment 6 are prevented from deterioration.

Since the cathode compartment also serves as the concentrating compartment, the electric conductance of the electrode water in the cathode compartment becomes high. This also makes it possible that enough electric current flows between the electrodes 1 and 2 even when the voltage applied therebetween is low.

The direction of the flow of the water in the concentration-cathode compartment 5 and the concentrating compartment 10 may be either parallel to or counter to that in the desalting compartment 7. The direction of the flow of water is preferably upward in the concentration-cathode compartment 5 and the anode compartment 6. Since gases such as $H_2$ and $O_2$, and in some cases, a small amount of $Cl_2$ are generated by direct electric current in each compartment 5, 6, the upward flow promotes removal of gas so as to prevent deflection flow.

As an example, the loading dose of Cl in the anode compartment in case that the concentrating compartment 10 is omitted from the electrodeionization apparatus of FIG. 1 or 7 and $Cl^-$ is entirely fed into the anode compartment 6 will be calculated below. It is assumed that raw water of 3 ppm in Cl concentration is fed to the anode compartment at a rate of 0.8 L/h and the same raw water is fed to the desalting compartment at a rate of 1.5 L/h.

In this case, since the substantially entire mount of Cl migrates from the desalting compartment to the anode compartment, the loading dose of Cl in the anode compartment is the sum of the followings:

Amount of Cl from desalting compartment=1.5 L/h·3 mg/L=4.5 mg/h; and

Amount of Cl from anode compartment=0.8 L/h·3 mg/L=2.4 mg/h, that is, 6.9 mg/h.

On the other hand, in the case of FIG. 1 or 7, the loading dose of Cl in the anode compartment is 2.4 mg/h because Cl is composed only of Cl in the raw water flowing into the anode compartment. It should be noted that if deionized water is fed to the anode compartment, the loading dose of Cl in the anode compartment becomes substantially zero.

As apparent also from this example, the placement of the concentrating compartment between the desalting compartment and the anode compartment makes the Cl concentration in the anode compartment low and lowers the amount of $Cl_2$ generated in the anode compartment.

In the electrodeionization apparatus, it is preferable that, as shown in FIG. 1 and FIG. 7, a part of the raw water or a part of the deionized water from the desalting compartment 7, preferably a part of the deionized water, is fed to the anode compartment 6, the concentrating compartment 10, and the concentration-cathode compartment 5 in sequence.

The reasons are described below.

That is, as $Cl^-$ ions exist in the anode compartment 6, chlorine may be produced by the electrode reaction so as to deteriorate members such as resins. Therefore, as mentioned above, it is preferable to use the deionized water not containing $Cl^-$ ions. Calcium scale is easily generated on the surface of the anion exchange membrane 4 in the concentrating compartment 10. In case that deionized water is fed into the anode compartment 6, the generation of calcium scale is prevented because the deionized water does not contain $Ca^{2+}$ ions. In the electrodeionization apparatus of the present invention, since $Cl^-$ ions from the desalting compartment 7 do not flow into the anion compartment 6 because of the second cation exchange membrane 3, the generation of chlorine can be inhibited.

[Another Structure of Concentration-Cation Compartment and Anode Compartment (FIG. 6)]

Figure 6:
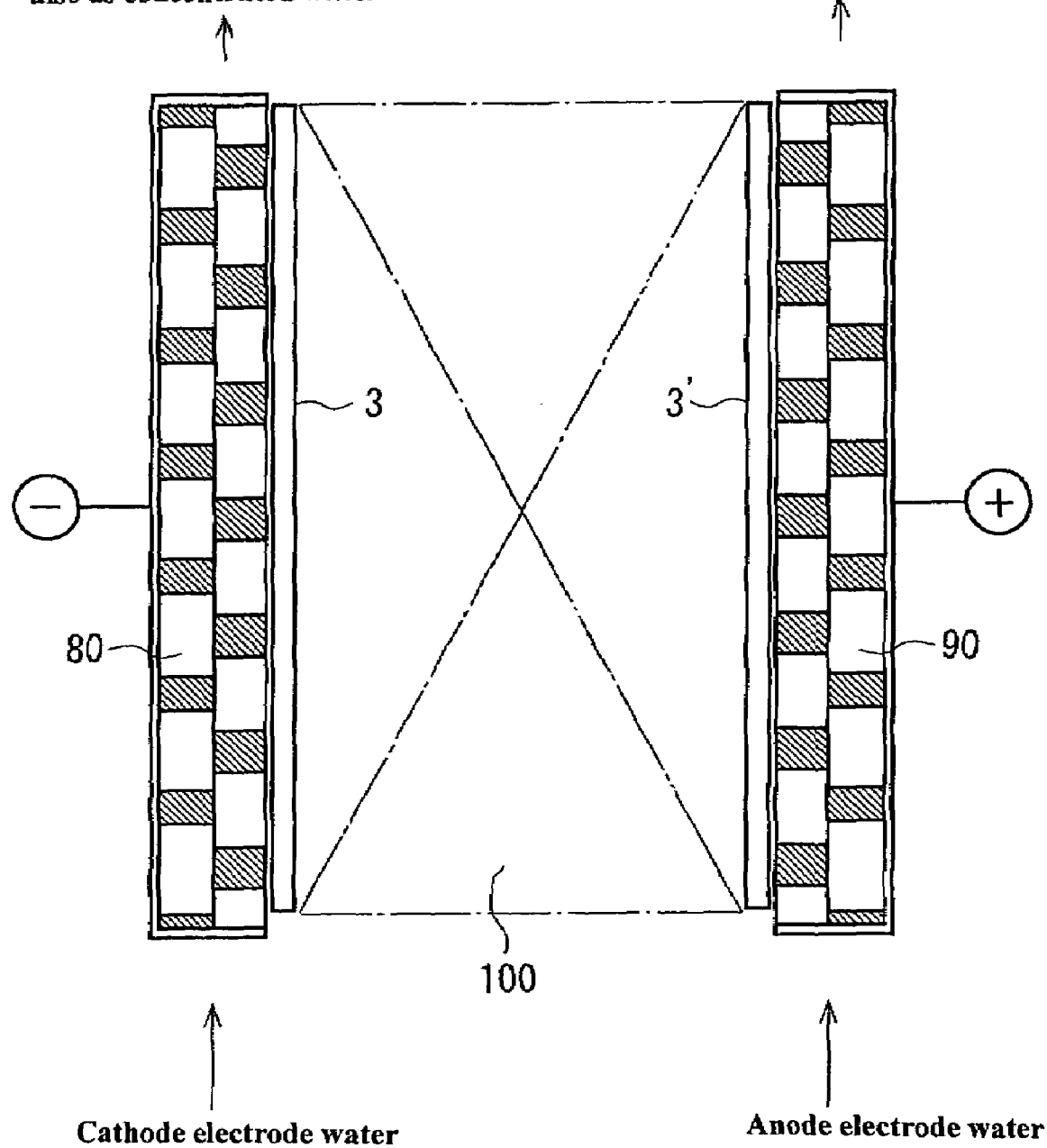
FIG. 6 is a vertical sectional view of electrode portion in an electrodeionization apparatus according to another embodiment.

In the electrodeionization apparatus of the present invention, the concentration-cation compartment and the anode compartment may be structured as shown in FIG. 6 so that the cathode plate 80 and the anode plate 90 have passages for electrode water. The cathode plate 80 is disposed to abut on the first cation exchange membrane 3 and the anode plate 90 is disposed to abut on the second cation exchange membrane 3'. Therefore, the electric resistance in the concentrating-cathode compartment and the anode compartment is reduced, thereby enabling efficient deionization even with low applied voltage. The electrode plates 80, 90 are each composed of a laminate of a plurality of perforated plates having a large number of openings penetrating in the width direction such that the openings of the perforated plates are partially overlap with each other to form passages.

The cathode plate 80 having the passages composes the concentration-cathode compartment. The anode plate 90 having the passages composes the anode compartment. The structure 100 (hypothetically shown by two-dot chain lines) between the cation exchange membranes 3, 3' of FIG. 6 is the same as the structure between membranes 3 and 3' shown in FIG. 1 or FIG. 7. In the electrodeionization apparatus of FIG. 6, water is fed in the same way as the case of FIG. 1 or FIG. 7.

[Electrodeionization Apparatus Having a Desalting Compartment Which is Divided into a Large Number of Cells (FIGS. 2 through 5)]

An electrodeionization apparatus in which a large number of cells are formed in a desalting compartment by a partition member will be described with reference to FIGS. 2 through 5.

A cathode electrode plate 12 is arranged along a cathode end plate 11 and a frame 13 for defining a concentration-cathode compartment is superposed on the outer periphery of the cathode electrode plate 12. A first cation exchange membrane 14 is superposed on the frame 13, a frame 20 for defining a desalting compartment is superposed on the cation exchange membrane 14, an anion exchange membrane 15 is superposed on the frame 20, a frame 16S for defining a concentrating compartment is superposed on the anion exchange membrane 15, a second cation exchange membrane 14S is superposed on the frame 16S, and a frame 16 for defining an anode compartment is superposed on the second cation exchange membrane 14S. An anode electrode plate 17 is superposed on the second cation exchange membrane 14S via the frame 16 for defining the anode compartment and an anode end plate 18 is further superposed on the anode electrode plate 17, thereby forming a laminated body. The laminated body is tightened by bolts or the like.

The inner space of the frame 20 is the desalting compartment. A partition member 21 is provided in the desalting compartment and an ion exchange resin 23 consisting of a mixture of an anion exchange resin and a cation exchange resin is filled in the partition member 21.

The inner space of the frame 13 for defining the concentration-cathode compartment is the concentration-cathode compartment 30 and the inner space of the frame 16S for defining the concentrating compartment is the concentrating compartment 50. The inner space of the frame 16 for defining the anode compartment is the anode compartment 40. The concentration-cathode compartment 30, the concentrating compartment 50, and the anode compartment 40 are filled with a cation exchange resin 8 as a conductive material.

In order to feed cathode water into the concentration-cathode compartment 30, openings 31, 32, 35, and 36 are formed in the end plate 11 and the frame 13 and slits 33 and 34 are formed in the frame 13.

The openings 31 and 32 overlap with each other and the openings 35 and 36 also overlap with each other. The openings 32 and 35 of the frame 13 communicate with the concentration-cathode compartment 30 through the slits 33 and 34, respectively.

Cathode electrode water flows through the openings 31 and 32, the slit 33, the concentration-cathode compartment 30, the slit 34, and the openings 35 and 36, in this order, and then is discharged as cathode electrode water functioning also as concentrated water.

Openings 41, 42, 45 and 46 are formed in the end plate 18 and the frame 16, and slits 43 and 44 are formed on the frame 16, in order to feed anode water into the anode compartment 40.

The openings 41 and 42 overlap with each other and the openings 45 and 46 also overlap with each other. The openings 42 and 45 of the frame 16 communicate with the anode compartment 40 through the slits 43 and 44.

Anode electrode water flows through the openings 41 and 42, the slit 43, the anode compartment 40, the slit 44 and the openings 45 and 46, in this order, and then is discharged as anode electrode water.

In order to feed raw water into the desalting compartment defined by the frame 20, openings 51, 52, 53S, 53, 62, 54, 57, and 60 are formed in the end plate 18, the anion exchange membrane 15, and frames 16, 16S and 20, respectively, and slits 55 and 56 are formed in the frame 20. It should be noted that the openings, formed in lower portions of the anion exchange membrane 15, the frame 16S, the cation exchange membrane 14S, and the frame 16, for allowing water to flow into the desalting compartment are not shown in the drawing. The openings 51 and 60 are formed in the end plate 18, the openings 54 and 57 are formed in the frame 20, the openings 52 is formed in the frame 16, and the opening 53 is formed in the anion exchange membrane 15.

The openings 51 through 54 and 62 overlap with each other and the openings 57 through 60 also overlap with each other. The openings 54 and 57 of the frame 20 communicate with the desalting compartment through the slits 55 and 56, respectively.

Raw water flows through the openings 51, 52, 53, 54, 62, the slit 55, the desalting compartment, the slit 56, and the openings 57 through 60, in this order, and then is discharged as deionized water (the product water).

In order to feed water into the concentrating compartment 50, openings 64, 65, 66 and 65S are formed in upper parts of the end plate 18, the flame 16 and 16S, and the cation exchange membrane 14S and the opening 66 communicates with the concentrating compartment 50 through a slit 67 formed in the frame 16S. An opening and a slit (not shown) similar to the opening 66 and the slit 67 are formed in a lower part of the frame 16S for defining the concentrating compartment, openings (not shown) are formed in lower parts of the cation exchange membrane 14S and the frame 16 for defining the anode compartment, respectively, and an opening 68 is formed in a lower part of the end plate 18 so that these openings overlap with each other. Water is introduced into the concentrating compartment 50 through the opening 68 and the water flowing out of the concentrating compartment 50 is discharged through the openings 66, 65S, 65, and 64.

Also in this embodiment, raw water or deionized water flows into the anode compartment 40 through the openings 41, 42 and flows out of the anode compartment 40 through the openings 45, 46. The water flows into the concentrating compartment 50 through the opening 68, flows out of the concentrating compartment 50 through the openings 66, 65S, 65, and 64, then flows into the concentration-cation compartment 30 through the openings 31, 32, and flows out of the concentration-cation compartment 30 through the openings 35, 36 as cathode electrode water also functioning as condensed water.

The frame 20 has a rectangular shape extending in a vertical direction. The partition member 21 arranged inside the frame 20 is in a hexagonal honeycomb form so that a large number of cells 22 are arranged in vertical and lateral directions. A pair of sides of each cell 22 extend in the longitudinal direction of the frame 20, i.e. in the vertical direction.

Figure 4:
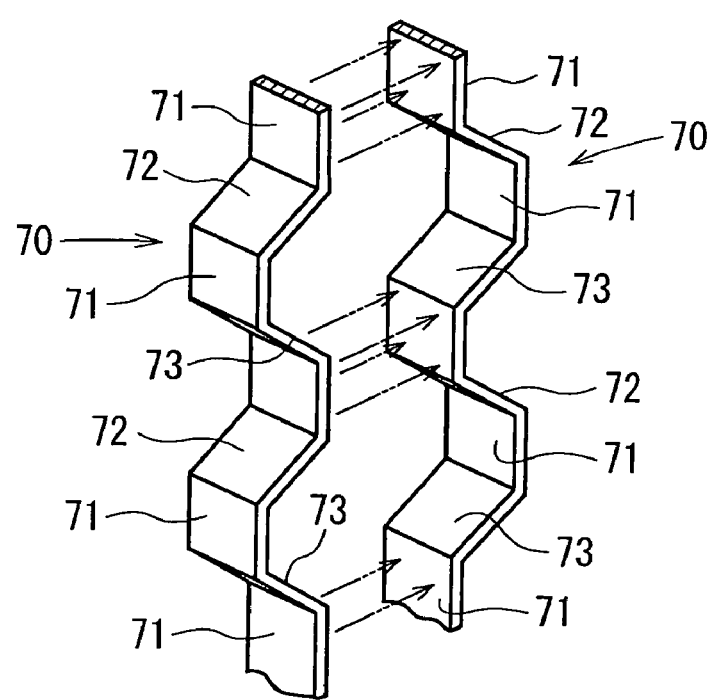
FIG. 4 is an exploded view of the partition member.

The partition member 21 may be previously formed as an integral part or may be formed by combining a plurality of parts. For example, as shown in FIG. 4, the partition member 21 may be formed by connecting vertical surfaces 71 of zigzag plates 70. Each zigzag plate 70 comprises inclined surfaces 72, 73 which are connected at an angle 120° with the vertical surfaces 71. In order to connect the vertical surfaces 71 together, adhesives may be employed. The zigzag plate 70 is made of material which is permeable to water but not permeable to ion exchange resin, for example, woven fabric, non-woven fabric, mesh, and porous material. The zigzag plate 70 is preferably formed to have rigidity by using synthetic resin or metal having acid resistance and alkali resistance. The vertical surfaces 71 may be permeable or not permeable to water.

The partition member 21 may be fitted in the frame 20. The frame 20 may be provided with a water permeable sheet or a mesh attached to one side thereof and the partition member 21 may be bonded to the sheet or the mesh.

Figure 5:
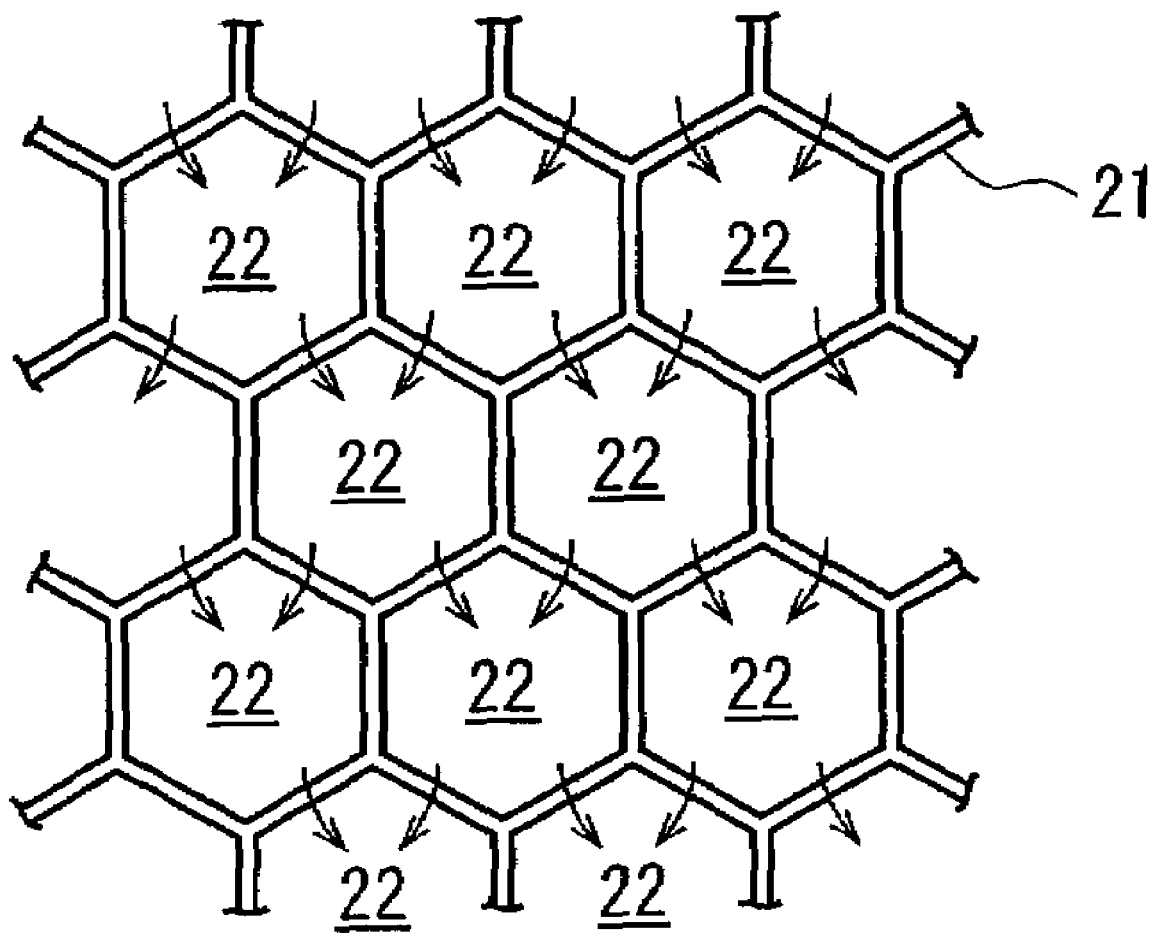
FIG. 5 is an illustration for explaining the state of water flow of the partition member.

Raw water introduced into the desalting compartment through the opening 54 and the slit 55 permeates the partition member 21 surrounding the cells 22 so as to flow into adjacent cells 22 and thus gradually flows downwardly as shown in FIG. 5. During this, the water is subjected to deionization. Finally, the water reaches the bottom of the desalting compartment and is taken out of the electrodeionization apparatus through the slit 56 and openings 57 through 60 as desalted water.

The general direction of water in the desalting compartment is a downward vertical direction because the opening 54 and the slit 55 for introducing raw water exist at the top of the frame 20 and the slit 56 and the opening 57 for taking out the desalted water exist at the bottom of the frame 20. Since the upper portions and the lower portions of the respective cells 22 are inclined relative to the general direction of the water flow, the water flows obliquely and downwardly from one cell 22 into the lower left cell 22 and the lower right cell 22 separately. Therefore, the water flows substantially uniformly to all cells 22, thereby improving the contact efficiency between the water to be treated and the ion exchange resin 23.

In this desalting compartment, since the cells 22 are relatively small, the downward pressure applied to the ion exchanger in each cell by the self weight of the ion exchanger and water pressure is low. Therefore, the ion exchanger is not compressed in any of the cells 22, thereby preventing the ion exchanger from being partially compressed at the lower portion of the cells. In this embodiment, the ion exchange resin filled in the cells 22 is a mixture of an anion exchange resin and a cation exchange resin, and it may employ the following filling materials (i) to (iii):

(i) One of the anion exchange resin, the cation exchange resin, and the amphoteric ion exchange resin is filled in all of the cells;

(ii) A mixture or mixtures of two or three of the anion exchange resin, the cation exchange resin, and the amphoteric ion exchange resin is filled in all of the cells, wherein the mixing ratio and mixing kinds may be the same for all of the cells or may be different partially or entirely; and (iii) The anion exchange resin is filled in several cells 22, the cation exchange resin is filled in other several cells 22, a mixture of the anion exchange resin and the cation exchange resin, or the amphoteric ion exchange resin is filled in the residual cells 22.

In the cases (ii) and (iii), the number of cells 22 in which anion exchange resin is filled and the number of cells 22 in which cation exchange resin is filled may be adjusted according to the ratios of anion and cation in the raw water.

LV of the desalting compartment is preferably in a range of from 15 to 45 m/h and SV thereof is preferably in a range of from 80 to 280 $Hr^{-1}$ in this electrodeionization apparatus.

Since this electrodeionization apparatus as shown in FIGS. 2 through 5 also has a smaller number of laminated compartments between the cathode and the anode, the electrical resistance thereof is low, so that adequate electric current can flow at lower voltage. Also in the form of this embodiment, $Cl^-$ in the desalting compartment migrates only to the concentrating compartment 50 and does not migrate to the anode compartment 40 so that the $Cl^-$ concentration in the anode compartment 40 is low and the amount of $Cl_2$ generated in the anode compartment 40 is small. Accordingly, the cation exchange resin 8 in the anode compartment 40 and the cation exchange membrane 14S exposed to the anode compartment 40 are prevented from deterioration.

The desalting compartment is occupied with honeycomb-shaped structure so as to provide treated water of a high degree of purity. In FIGS. 2 through 5, if the width (width in a direction perpendicular to the general flow direction of water) of the desalting compartment is small, the honeycomb-shaped structure may be omitted.

EXAMPLE AND COMPARATIVE EXAMPLE

Hereinafter, the present invention is further concretely described by following Example and Comparative Example.

Example 1

Feed water prepared by treating city water with activated carbon treatment and RO treatment was fed into the electrodeionization apparatus shown in FIG. 7. As for the quality of the feed water, the electricconductivity was 10 μS/cm, the $CO_2$ concentration was 30 ppm, the $SiO_2$ concentration was 2 ppm, and the water temperature was 10° C.

The desalting compartment 7 of the electrodeionization apparatus had an effective width of 17 mm, an effective height of 194 mm, and a thickness of 5 mm. The thickness of either of the concentrating compartment 10, the anode compartment 6, and the concentration-cation compartment 5 was 2.5 mm. The desalting compartment 7 was filled with an ion exchange resin mixture of anion exchange resin/cation exchange resin=7/3 (volume ratio), the concentrating compartment 10 was filled with the anion exchange resin, and the anode compartment 6 and the concentration-cathode compartment 5 were filled with the cation exchange resin. Electrode plates made of platinum-plated titanium were used as the anode 2 and the cathode 1.

The feed water was fed into the desalting compartment 7 at a rate of 3 L/h. A part (1 L/h) of product water (deionized water) was discharged from the apparatus after passing through the anode compartment 6, the concentrating compartment 10, and the concentration-cathode compartment 5, in this order.

The operation was continued one month under a condition that the electric current was 0.2 A. The operation conditions were as follows. After one month operation, the specific resistance of product water was 15 MΩ·cm and the operational voltage was 8V. These values were no different from the initial values, that is, stable operation was obtained.

Ratio of the feeding rate (L/h) of water to the desalting compartment 7 relative to the effective area ($dm^2$) of the anion exchange membrane 4 of the desalting compartment 7=9.1.

Loading dose (mg-$CO_2$/h) of carbonic acid fed into the desalting compartment 7 relative to the effective area ($dm^2$) of the anion exchange membrane 4 of the desalting compartment 7=272.

Loading dose (mg-$SiO_2$/h) of silica fed into the desalting compartment 7 relative to the effective surface area ($dm^2$) of the anion exchange membrane 4 of the desalting compartment 7=18

Current density ($mA/dm^2$)=606

Comparative Example

The operation was conducted in the same manner as that of Example 1 except that the ion exchange resin for the concentrating compartment 10 was an ion exchange resin mixture of anion exchange resin/cation exchange resin=7/3 (volume ratio). At an initial stage (a third day) of the operation, the specific resistance of product water was 10 MΩ·cm and the operational voltage was 8V. After one month, however, the specific resistance of product water was 8 MΩ·cm and the operational voltage was 12V. There was a tendency to lower the water quality and increase the electric resistance.

INDUSTRIAL APPLICABILITY

As described in the above, in an electrodeionization apparatus of the present invention, only a single concentration-cathode compartment, a single desalting compartment, a single concentrating compartment, and a single anode compartment are arranged between a cathode and an anode so that the distance between the electrodes is small. In addition, the cathode compartment also serves as a concentrating compartment and electrode water is concentrated water having high electric conductance, thereby making it possible that enough electric current flows between the electrodes even when the voltage applied therebetween is low and conducting enough deionization. Further, since the generation $Cl_2$ in the anode compartment is prevented or inhibited, the conductive material such as cation exchange resin in the anode compartment and the second cation exchange membrane exposed to the anode compartment is prevented from deterioration for long periods.

The electrodeionization apparatus of the present invention is extremely suitable for an application in which a small amount of treated water is produced, such as in a small laboratory and for a small fuel cell.

The invention claimed is:

1. An electrodeionization apparatus comprising:
   a cathode;
   an anode;
   a first cation exchange membrane, an anion exchange membrane, and a second cation exchange membrane arranged between the cathode and the anode;
   a concentration-cathode compartment formed between the cathode and the first cation exchange membrane;
   a desalting compartment formed between the first cation exchange membrane and the anion exchange membrane;
   a concentrating compartment formed between the anion exchange membrane and the second cation exchange membrane;
   an anode compartment formed between the second cation exchange membrane and the anode;
   conductive materials filled in the concentrating compartment, the anode compartment, and the concentration/cathode compartment, respectively; and
   an ion exchanger filled in the desalting compartment,
   wherein a partition member is fitted in the desalting compartment so that a large number of cells are defined by the partition member, the first cation exchange membrane and the anion exchange membrane in the desalting compartment;
   the ion exchanger is filled in the respective cells;
   at least parts of the partition member facing the cell are inclined relative to a general flow direction of water in the desalting compartment; and
   at least the inclined parts of the partition member allow penetration of water but prevent penetration of the ion exchanger.

2. An electrodeionization apparatus as claimed in claim 1, wherein the conductive material which is filled in the anode compartment and the concentration-cathode compartment is an ion exchange resin.

3. An electrodeionization apparatus as claimed in claim 2, wherein said ion exchange resin is a cation exchange resin.

4. An electrodeionization apparatus as claimed in claim 1, wherein ratio of feeding rate (L/h) of water to the desalting compartment relative to an effective area ($dm^2$) of the anion exchange membrane of the desalting compartment is 5 or more.

5. An electrodeionization apparatus as claimed in claim 1, wherein loading dose (mg-$CO_2$/h) of carbonic acid fed into the desalting compartment relative to an effective area ($dm^2$) of the anion exchange membrane of the desalting compartment is 80 or more.

6. An electrodeionization apparatus as claimed in claim 1, wherein loading dose (mg-$SiO_2$) of silica fed into the desalting compartment relative to an effective surface area ($dm^2$) of the anion exchange membrane of the desalting compartment is 8 or more.

7. An electrodeionization apparatus as claimed in claim 1, wherein current density is 300 $mA/dm^2$ or more.

8. An electrodeionization apparatus as claimed in claim 1, wherein the concentrating compartment is filled with an anion exchange resin which is heat-stable.

9. An electrodeionization apparatus comprising:
   a cathode;
   an anode;
   a first cation exchange membrane, an anion exchange membrane, and a second cation exchange membrane arranged between the cathode and the anode;
   a concentration-cathode compartment formed between the cathode and the first cation exchange membrane;
   a desalting compartment formed between the first cation exchange membrane and the anion exchange membrane;
   a concentrating compartment formed between the anion exchange membrane and the second cation exchange membrane;
   an anode compartment formed between the second cation exchange membrane and the anode;

conductive materials filled in the concentrating compartment, the anode compartment, and the concentration-cathode compartment, respectively; and an ion exchanger filled in the desalting compartment, wherein the conductive material filled in said concentrating compartment is an ion exchanger, and a filling ratio of an anion exchanger/cation exchanger of the ion exchanger for said concentrating compartment is greater than a filling ratio of an anion exchanger/cation exchanger of the ion exchanger for said desalting compartment.

10. An electrodeionization apparatus as claimed in claim 9, wherein the ion exchanger for the concentrating compartment is an ion exchange resin.

11. An electrodeionization apparatus as claimed in claim 10, wherein the ion exchange resin is at least one of an anion exchange resin of which degree of cross-linkage is in a range of from 3% to 8% and a cation exchange resin of which degree of cross-linkage is in a range of from 5 to 10%.

12. An electrodeionization apparatus as claimed in claim 9, wherein said desalting compartment is filled with the anion exchanger and the cation exchanger and the concentrating compartment is filled only with the anion exchanger.

13. An electrodeionization apparatus as claimed in claim 9, wherein said concentrationcathode compartment and the anode compartment are filled only with a cation exchanger.

14. An electrodeionization apparatus comprising:
a cathode plate having water passages;
an anode plate having water passages;
a first cation exchange membrane abutting on the cathode plate;
a second cation exchange membrane abutting on the anode plate;
an anion exchange membrane arranged between the first cation exchange membrane and the second cation exchange membrane;
a concentration-cathode compartment formed between the cathode plate and the first cation exchange membrane;
a desalting compartment formed between the first cation exchange membrane and the anion exchange membrane; and
a concentrating compartment formed between the anion exchange membrane and the second cation exchange membrane,
wherein passages are provided which allow raw water or deionized water from the desalting compartment to be fed as electrode water to an anode compartment, allow water discharged from the anode compartment to be fed to the concentrating compartment, and allow water discharged from the concentrating compartment to be fed to the concentration-cathode compartment.

15. An electrodeionization apparatus as claimed in claim 14, wherein the desalting compartment is filled with an ion exchanger.

16. An electrodeionization apparatus as claimed in claim 15, wherein a partition member is fitted in the desalting compartment so that a large number of cells are defined by the partition member, the first cation exchange membrane and the anion exchange membrane in the desalting compartment;

an ion exchanger is filled in the respective cells;

at least parts of the partition member facing the cell are inclined relative to a general flow direction of water in the desalting compartment; and at least the inclined parts of the partition member allow penetration of water but prevent penetration of the ion exchanger.

17. An electrodeionization apparatus as claimed in claim 14, wherein the concentrating compartment is filled with a conductive material.

* * * * *